M. Chapman,
Knife Handle.
No. 107,223.        Patented Sep. 13, 1870.

Witnesses.
Austin DeWolf
Michael Kelliher

Matthew Chapman
Inventor.

United States Patent Office.

MATTHEW CHAPMAN, OF GREENFIELD, MASSACHUSETTS.

Letters Patent No. 107,223, dated September 13, 1870.

IMPROVEMENT IN HANDLES FOR TABLE AND OTHER CUTLERY.

The Schedule referred to in these Letters Patent and making part of the same.

I, MATTHEW CHAPMAN, of Greenfield, in the county of Franklin and State of Massachusetts, have invented certain Improvements in Knives, Forks, and other articles of cutlery, of which the following is a specification

Nature and Objects of the Invention.

My invention consists in welding a wrought-iron handle, made of light strap-iron, to a short lip projecting from a steel blade of the usual form, the object being to make a finished and durable handle at less cost than has heretofore been attained. It will be seen that, with this process of manufacturing, the amount of steel usually required for bolsters and tangs is dispensed with, thus greatly reducing the expense of labor and material.

The following general description will enable any person skilled in the art to manufacture the same, reference being had to the accompanying drawing, in which—

Figure 1:
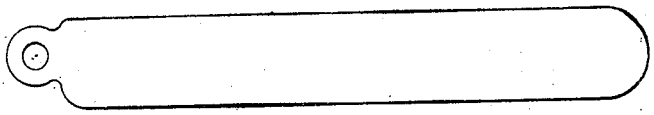
Figure 1 represents a blade with a hole through the lip or tang, in the form necessary to receive the handle, being simply a sheet of steel trimmed or struck up by a drop or press into the form shown, with a hole in the tang for a rivet.
Figure 2:
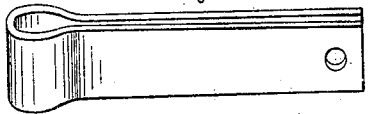
Figure 2 represents a piece of strap-iron bent around in the form of a handle, with holes for a rivet corresponding in size with the hole in the lip of the blade by which the handle is secured to the blade.
Figure 3:
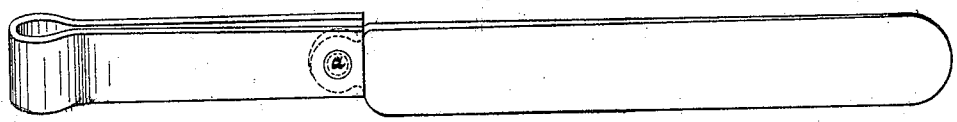
Figure 3 represents the blade with the handle riveted, as shown at $a$.
Figure 4:
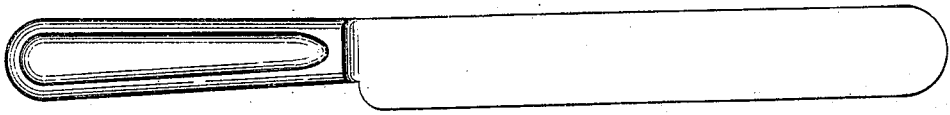

The knife, as shown at fig. 3, is heated to a proper degree, and passed under a powerful drop-press, which, at one blow, perfectly welds the handle to the blade, and leaves it in a solid and permanent form convenient for use, as represented at fig. 4, the pattern and style of which may be varied at pleasure.

The blade is thus tempered and finished in the usual manner.

I am aware that table and other cutlery has been made with metal handles, by running malleable iron, gray iron, or other metal, onto the tang; also that the handles and blades have been forged from a solid piece of metal; none of which methods are like the one herein described.

Having described my invention,

What I claim, and desire to secure by Letters Patent, is—

1. The mode of making the handles of knives, forks, and other articles of table and other cutlery, substantially as herein described.

2. Knives, forks, and other articles of table and other cutlery, made in the manner substantially as herein described, as a new article of manufacture.

MATTHEW CHAPMAN.

Witnesses:
   AUSTIN DEWOLF,
   MICHAEL KELLIHER.